US00H002279H

(19) United States
(12) Statutory Invention Registration
Lightsey

(10) Reg. No.: US H2279 H
(43) Published: Jul. 2, 2013

(54) METHOD FOR PREVENTION OF CROSS SITE REQUEST FORGERY ATTACK

(75) Inventor: John Lightsey, Houston, TX (US)

(73) Assignee: CPanel, Inc., Houston, TX (US)

(21) Appl. No.: 12/873,185
(22) Filed: Aug. 31, 2010
(51) Int. Cl.
*H04L 29/06* (2006.01)

(52) U.S. Cl. ..... 713/168
(58) Field of Classification Search ..... None
See application file for complete search history.

(56) References Cited

U.S. PATENT DOCUMENTS

2004/0006693 A1 * 1/2004 Vasnani et al. ..... 713/168
2006/0020684 A1 * 1/2006 Mukherjee et al. ..... 709/219
2012/0054846 A1 * 3/2012 Lightsey ..... 726/9

OTHER PUBLICATIONS

Barth A et al., "Robust Defenses for Cross–Site Request Forgery", CCS'08, Oct. 27–31, 2008, Copyright 2008 ACM 978–1–59593–810–7/08/10.*
Jesse Burns, Cross Site Reference Forgery An introduction to a common web application weakness, 2005, Information Security Partners, LLC. Version 1.1.
Chris Shiflett, Cross–Site Request Forgeries, 42 pages, php|architect on Dec. 13, 2004.

* cited by examiner

*Primary Examiner*—Daniel Pihulic
(74) *Attorney, Agent, or Firm*—Norton R. Townsley; Belasco, Jacobs & Townsley, LLP

(57) ABSTRACT

An improved method for preventing XSRF attack on a web site, which has a URL and is accessible from a port on a server. This invention: determines whether a requestor is legitimate; generates a session token for each session on the web site requested by the legitimate requestor; embeds the session token in a session cookie; additionally generates a security token; embeds the security token in the original request URL; and redirects the web site request to the newly formed URL. The subsequent request of the URL containing the security token allows the server to verify the token and serve the web site to the legitimate requestor. In other words the server's web site for that user for that session is: port/security token/URL/ form data.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR PREVENTION OF CROSS SITE REQUEST FORGERY ATTACK

BACKGROUND OF THE INVENTION (1) Field of the Invention

The present invention relates to the field of web application vulnerability and more particularly to prevention of Cross Site Request Forgery attack.

(2) Description of the Related Art

Security tokens guard against a common form of web application vulnerability called a Cross Site Request Forgery (XSRF) attack. This vulnerability utilizes weaknesses in the design of web authentication mechanisms. A web browser is typically authenticated once per browsing session to a secured web destination. The attacker uses that persistent authentication to deceptively initiate requests to an authenticated web destination without the knowledge of the browser user. A XSRF attack commonly takes the form of hidden requests to another secured site within a malicious page. If the viewer of the page with hidden requests had previously visited and authenticated the target site, then the requests initiated by the malicious page will happen transparently to the user. This process can be used to exploit any of the exposed functionality of target site and gather privileged information with the browser user's full privilege level on the target site.

One effective technique to prevent XSRF attacks requires the use of a unique token of data passed between requests from the browser to the target site. By passing unique data between requests, a malicious site is prevented from attacking another web destination because the malicious site will have no knowledge of the required unique data.

A good description of the established best practice approach to prevent XSRF attacks can be seen at "Security Corner: Cross-Site Request Forgeries", published in php|architect on 13 Dec. 2004, specifically the part about including tokens in the form data.

Examples

Standard URL https://domain.com/pathlto/web/application.cgi

Standard URL including token https://domain.com/path/to/web/application.cgi?token=A9DFEZ134ZFYH Existing methods of employing this measure require that the target site be designed from the beginning with this technique in mind, In other words, since the token is an argument of the URL the using application must be programmed to accept this token. All pages must handle the token and ensure that links and functionality within the page pass and accept the token of data. While this technique is effective, it requires redesign of legacy web applications and sites. In many cases this redesign can introd Development of a technique for including security tokens in web authentication mechanism which can be included in all requests and thus obviates the need to reprogram legacy web applications represents a great improvement in the field of web security and satisfies a long felt need of web site programmers, web site operators and the browsing public.

SUMMARY OF THE INVENTION

The present invention is an improved method for preventing XSRF attack on a web site. The web site has a URL and is accessible from a port on a server. This invention: determines whether a requestor is legitimate; generates a session token for each session on the web site requested by the legitimate requestor; embeds the session token in a session cookie; additionally generates a security token; embeds the security token in the original request URL; and redirects the web site request to the newly formed URL. The subsequent request of the URL containing the security token allows the server to verify the token and serve the web site to the legitimate requestor. In other words the server's web site for that user for that session is: port/security token/URL/form data.

A web site has a URL and is accessible from a port on a server. This invention:

determines whether a requestor is legitimate;

generates a session token for each session of the web site requested by the legitimate requestor;

embeds the session token in a session cookie;

communicates the session cookie to the legitimate requestor;

generates a security token;

rewrites the URL to contain the security token, redirects the requestor to the newly formed URL, and serves the web site to the legitimate requestor.

The web site has an address of server: port/security token/URL/form data.

In other words, this invention requires a requestor to furnish a security token embedded in the URL before serving the contents of the web site. In this invention, the token is in the URL rather than being included in the form data. This means that only the sewer has to recognize and react to the token. Thus, the application does not have to be programmed or reprogrammed to accommodate the token. Consequently, this invention allows incorporation of increased security without the need to reprogram legacy applications.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
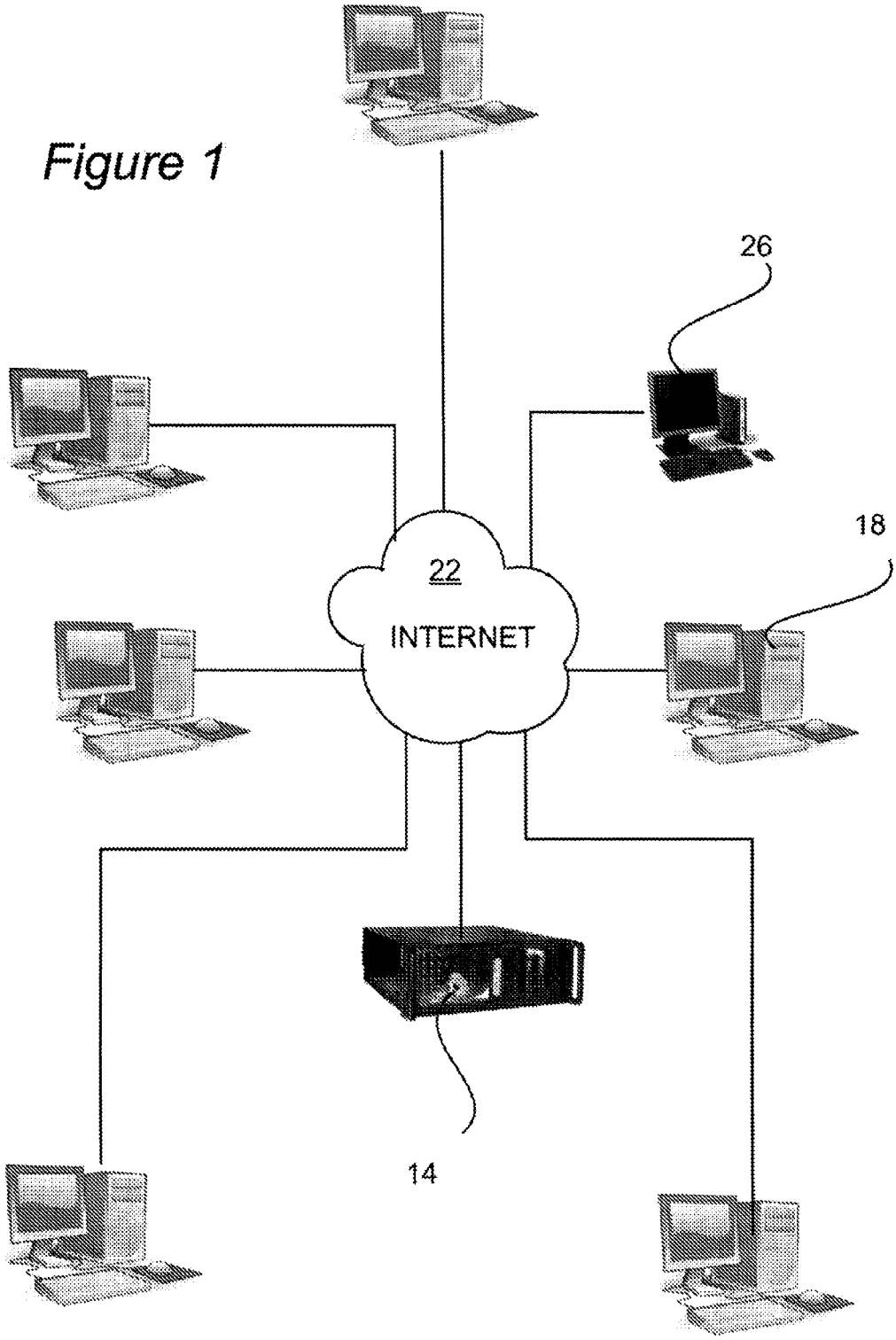
FIG. 1 is a diagram showing how connection of the sewer containing this invention to the internet.

FIG. 1 is a diagram showing connection of the server 14 containing this invention 10 to the internet. Most other users 18 connected to the internet 22 are legitimate requestors who might wish at some point to access the web site maintained on this server 14. The web site has a URL of the standard form, server: port/token/resource. For example https://domain.com/path/to/web/application.cgi. One user 26, however, is malicious and wishes to launch an XSRF attach on this server 14 and its web site.

Figure 2:
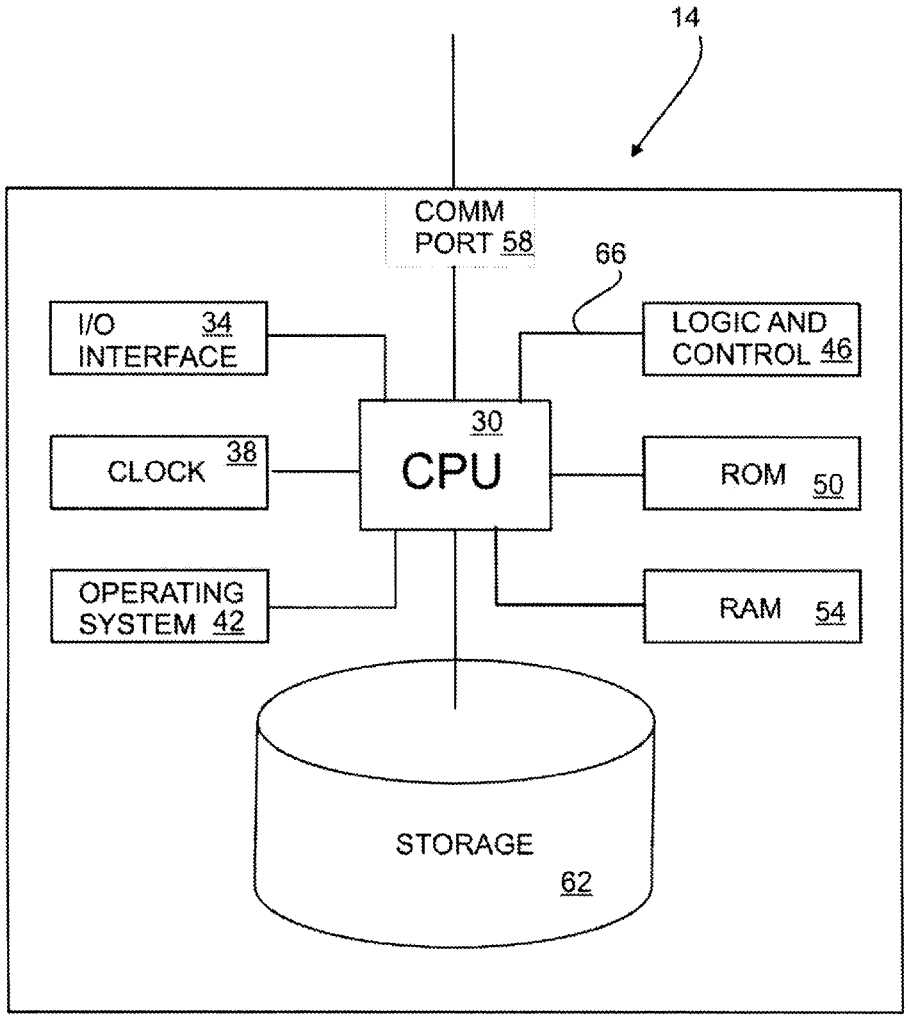
FIG. 2 block diagram of the architecture of the server containing this invention.

FIG. 2 depicts a block diagram of the data processing system 14 (server) containing this invention. The data processing system 14 includes a central processing unit 30 (CPU), an input and output (I/O) INTERFACE 34, a CLOCK 38, an operating system 42 (OS), a LOGIC AND CONTROL system 46, a read only memory 50 (ROM), a random access memory 54 (RAM), a communication port 58, and a data storage device 62. The data storage device 62 may be a fast, disk-based data storage device which is well known in the co One sever 14 useful for this task is manufactured by SUN Microsystems known in the industry as the SUN SPARC processor (e.g., a SPARC 1000) running an SUN SOLARIS operating system 42. Mother is an International Business Machines Corporation NUMA-Q server (containing an Intel Pentium III CPU) running the Microsoft Corporation Windows NT operating system 42. A further is a Hewlett-Packard Corporation HP9000 Superdome server (e.g., HP PA-8600) running the HP-UX UNIX operating system 42.

Database management system software (DBMS) is preferably implemented in a relational database environment such as one produced by ORACLE Corporation known in the industry as the ORACLE 8i relational database management system, or one produced by International Business Machines Corporation known in the industry as the DB2 Universal Database, or one manufactured by Microsoft Corporation known in the industry as the SQL Server relational database management system. It is also contemplated that the data processing system may be a personal computing system such as one manufactured by Dell Incorporated operating with appropriate local processing software applications and in conjunction with local area network (LAN) data connections thus enabling access to distributed computing and storage devices (e.g., databases) as may be required.

The use and operation of the component parts of data processing system 14 including the use and operation of CPU 30, I/O INTERFACE 34, CLOCK 38, OS 42, LOGIC AND CONTROL 46, ROM 50, RAM 54. COMM PORT 58, couplings 66, and data storage device 62 will be readily apparent to those skilled in the field of computers and the like.

The interconnections 66 of the component parts making up data processing system 14 will be readily known in the art of computer system design and implementation. Moreover, the use of a DBMS like ORACLE 8i, including the maintenance, querying, and manipulation of databases and corresponding tables related to a system such as ORACLE 8i, will be as readily understood by those skilled in the art of database management technologies.

COMM PORT 58 is preferably configured to communicate via telecommunications links or some other network topology to other computers 26 via the INTERNET 22. Electronic communications in the form of data communications will be readily apparent to those skilled in the art. Of course, COMM PORT 58 could be configured to communicate via a networking topology in an open-standards arrangement or in a closed intranet environment utilizing conventional networking protocols such as TCP/IP and the like.

Figure 3:
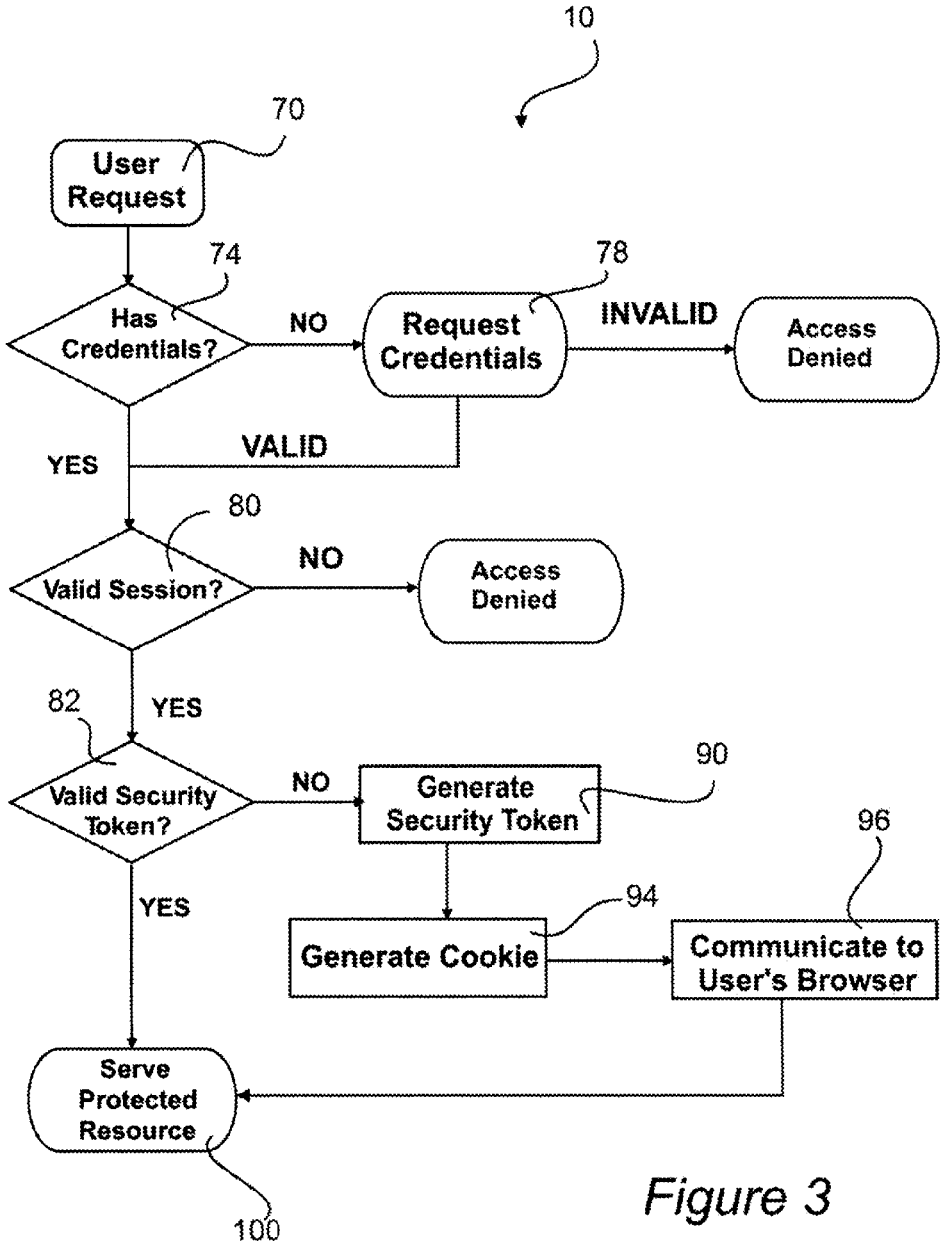
FIG. 3 is a flow chart illustrating the operation of this invention.

FIG. 3 shows how this invention 10 works. At the start 70 a user requests a protected resource. This will typically be a person trying to access a web site on his computer with a browser. The invention 10 will then determine if the user has proper credentials 74. If the user does not have credentials (such as a user id and password), i.e. this is the first time that the user has requested this resource, the system will determine whether the user is a live person orjust a computer programmed to crawl the web looking for sites to attack. This step 78, as is well known to those familiar with web site design, is currently usually done by requesting information from the user (such as, at a minimun, name and email address) and requiring the user to correctly decipher some irregularly formed letters and numbers. In future such determination may be done with retinal or fingerprint scanning or equivalent technology. As is well known, machines are currently incapable of deciphering irregularly formed letters and nembers. So this technique effectively discriminates between live persons and machines.

If the user already has credentials the invention 10 determines 80 whether a session is currently valid. If not, access is denied. If the session is valid the invention 10 determines 82 whether the cookie on the user's browser has a security token valid for this particular session. If the user has a security token valid for this particular session, the user is allowed 100 to log on to the web site.

The only way a user would not have a valid session security token is if it was the user's initial log in for the current session. If the security token is not valid, the invention 10 generates a session security token 90 and a cookie 94, and communicates 96 these to the user's computer 26 where they are saved by the browser. Then the user is allowed 100 to log on to the web site.

The security tokens feature of this invention provides protection by passing unique data between all requests. Rather than include handling of this data in request parameters or inside of the authentication mechanism, the tokens pass the data within the URL of all requests. The token is appended to the beginning of the URL: the token is parsed out of requests by the web application server and handed off to the authentication layer. In other words, the URL is formulated as follows:

server: port/token/resource

The first element, delineated by a forward slash character following the server and port (optional for standard ports), is set as the token. The elements following the token are what would normally be the URL of the request. Tokens are generated and assigned for each authenticated session. The tokens are randomly generated and recorded on the server.

Examples:

https://domain.com/cpsess6347821693/path/to/web/application.cgi https://dev.cpanel.net:2087/psess6347821693/scripts4/listaccts https://dev.cpanel.net:2083/cpsess5890816836/frontend/x3/index.html This method allows all parts of web applications to utilize security tokens by using relative URLs rather than absolute URLs, a far simpler design pattern than is typically employed to provide unique data tokens.

The following reference numerals are used on FIGS. 1 through 3:

10 method for prevention of cross site request forgery attack of this invention

14 server

18 malicious user

22 internet

26 legitimate user

30 CPU

34 I/O INTERFACE
38 CLOCK
42 OS
46 LOGIC AND CONTROL
50 ROM
54 RAM
58 COMM PORT
62 STORAGE
66 interconnections
70 start
74 credential determination step
78 authentication of credentials
80 determination of validity of current session
82 determination of validity of security token
90 generation of security token
94 generation of cookie
96 communication of security token and cookie to user's browser step
100 web site use Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An improved method for preventing XSRF attack on a web site, said web site having a URL and being accessible from a port on a server, comprising the steps of:

a) generating a security token for each session of said web site requested by a legitimate requestor;

b) embedding said security token within the URL;

c) redirecting the legitimate requestor to the URL containing the security token; and d) serving said web site to said legitimate requestor.

2. An improved method as claimed in claim 1 in which said web site has an address of said server: said port/said security token/said URL.

3. An improved method for preventing XSRF attack on a web site, said web site having a URL and being accessible from a port on a server, comprising the steps of requiring a requestor to furnish a security token before serving the contents of said web site; said security token being included in the web site address.

4. An improved method as claimed in claim 3 in which said web site has an address of said server: said port/said security token/said URL.

5. An improved method for preventing XSRF attack on a web site, said web site having a URL and being accessible from a port on a server, comprising the steps of:

a) determining whether a requestor is legitimate;

b) generating a session token for each session of said web site requested by said legitimate requestor;

c) embedding said session token in a session cookie;

d) communicating said session cookie to said legitimate requestor;

e) generating a security token;

f) rewriting the URL to contain the security token, g) redirecting the requestor to the newly formed URL, and h) serving said web site to said legitimate requestor.

6. An improved method as claimed in claim 5 in which said web site has an address of said server: said port/said security token/said URL.

* * * * *